United States Patent [19]

Shivvers

[11] 4,026,426

[45] May 31, 1977

[54] DRYING APPARATUS FOR GRAIN, BEANS AND THE LIKE

[76] Inventor: Charles C. Shivvers, 614 W. English, Corydon, Iowa 50060

[22] Filed: Nov. 10, 1975

[21] Appl. No.: 630,177

[52] U.S. Cl. .......................... 214/17 DB; 198/661
[51] Int. Cl.² .................. B65G 33/00; B65G 37/00
[58] Field of Search ......... 198/214, 661; 214/17 D, 214/17 DA, 17 DB

[56] References Cited

UNITED STATES PATENTS

| | | | |
|---|---|---|---|
| 1,177,792 | 4/1916 | Mims | 198/214 |
| 2,569,039 | 9/1951 | Berthelot | 198/214 |
| 2,733,051 | 1/1956 | Street | 198/214 |
| 3,487,961 | 1/1970 | Neuenschwander | 214/17 DA |
| 3,563,399 | 2/1971 | Shivvers | 214/17 DA |
| 3,698,541 | 10/1972 | Barr | 198/214 |
| 3,765,548 | 10/1973 | Shivvers | 214/17 DA |

Primary Examiner—Albert J. Makay
Attorney, Agent, or Firm—Rudolph L. Lowell

[57] ABSTRACT

A sweep auger, mounted for rotation in a horizontal plane within a circular storage bin is comprised of two flights. The first flight has a constant diameter and a constant pitch. The second flight has the same constant diameter but a variable pitch so as to form a composite flight having sections of variable thickness longitudinally of the sweep auger. The sweep auger is capable of removing a uniform layer of grain and beans and the like from the bin floor during each complete revolution across the floor of the storage bin, and is adapted to handle a variety of material particle sizes.

3 Claims, 6 Drawing Figures

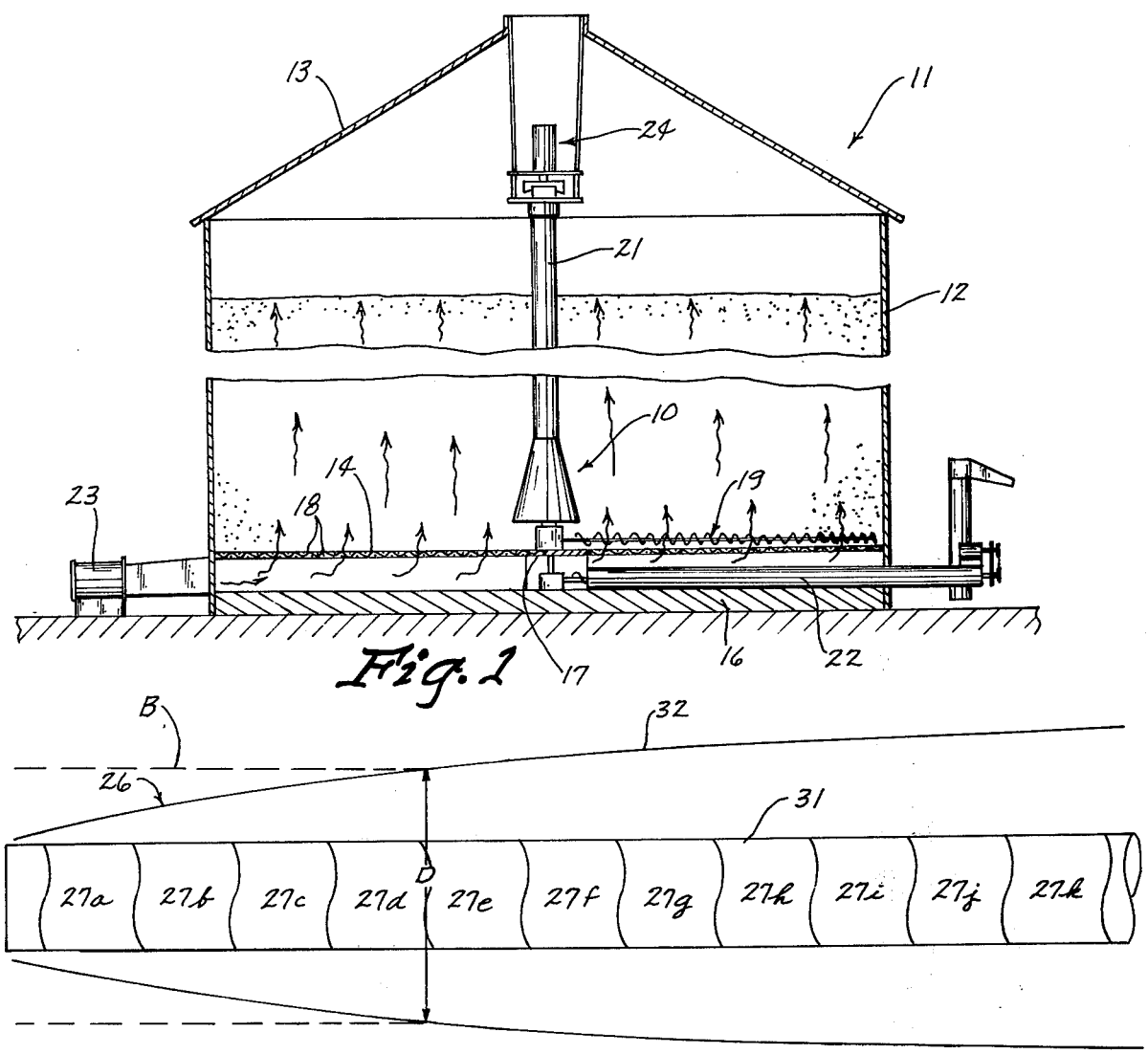
Fig. 1
Fig. 2
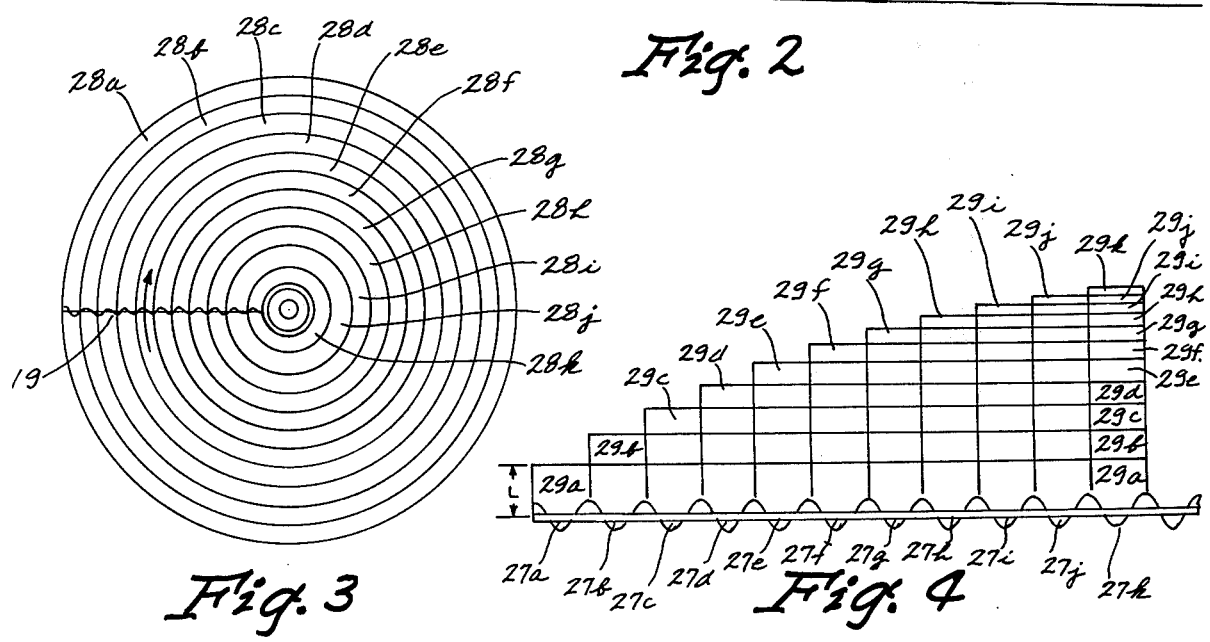
Fig. 3
Fig. 4

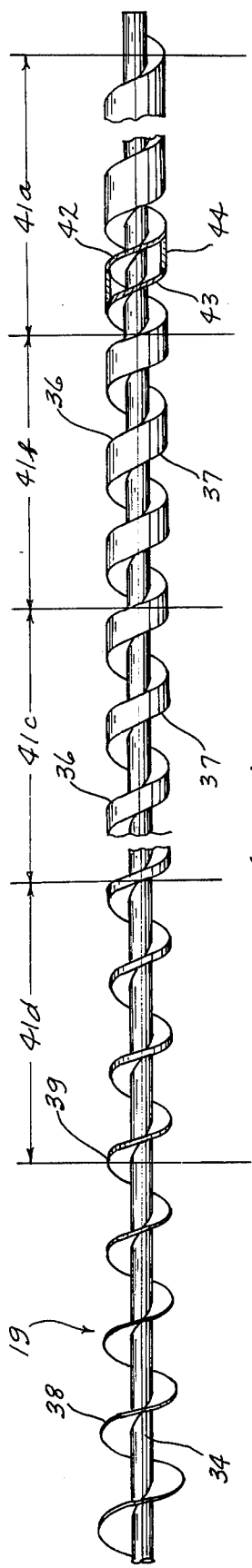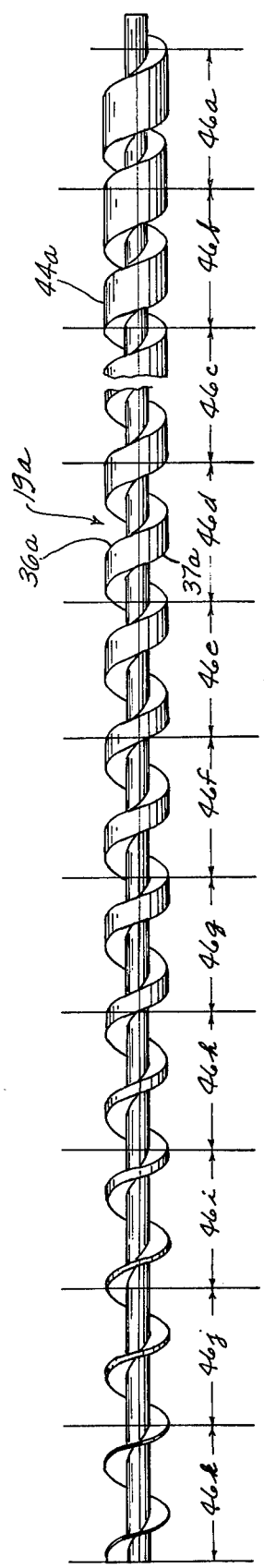

1

DRYING APPARATUS FOR GRAIN, BEANS AND THE LIKE

BACKGROUND OF THE INVENTION

A sweep auger of the general type, to which the present invention is applicable, is described in detail in U.S. Pat. No. 3,563,399, granted Feb. 16, 1971, for "Method For Circulating Grain Stored In A Circular Bin", wherein the patentee is the inventor of the present invention. In such patent there is described an apparatus for removing a horizontal layer of grain of uniform thickness from the bin floor during each complete revolution of the auger across the bin floor and which apparatus received immediate commercial success and is now presently widely used.

It has been found in the field that broader demands were being made for the invention of U.S. Pat. No. 3,563,399 whereby users of the equipment desired applicant's apparatus to move products of different particle size. Relatively large particle products, such as coffee beans, for example, cannot be removed in a uniform layer from the bin floor when the auger has flights of relatively small diameter at the outer end thereof, such as illustrated for the sweep auger in U.S. Pat. No. 3,563,399.

SUMMARY OF THE INVENTION

The invention provides an apparatus for continuously circulating and blending all portions of grain or like material particles in a bin to obtain a uniform moisture content to thereby eliminate overdrying or underdrying and the consequent deleterious affects which can ensue. The present apparatus can be easily manufactured to handle the size of the material particles which the user of the apparatus requires both economically and efficiently. By using two auger flights, one of which is a constant diameter and constant pitch, and the other of which is of the same constant diameter but of a variable pitch, the composite flight assembly is of a variable pitch and of a variable thickness longitudinally of the auger. As a result of this flight construction the volume of adjacent auger sections can be varied to provide for the removal of a uniform layer of a relatively large particle material from the bin floor by varying the shape of the auger flight to accommodate a predetermined material particle size while retaining a desired volume movement of the material over the complete length thereof.

The invention is illustrated with two preferred embodiments thereof. In one form of the invention, the inner portion of the auger is formed in accordance with the formula for the auger described in U.S. Pat. No. 3,563,399 and the outer portion of the auger has a flight of a constant diameter. The second embodiment of the invention has a flight of constant diameter over the entire length of the auger. In both embodiments, the flight is of variable pitch over the length thereof of constant diameter.

BRIEF DESCRIPTION OF THE DRAWINGS

FIG. 1 is a side elevational view of the material circulating apparatus of this invention shown in assembly relation with a circular storage bin;

FIG. 2 is an illustration of the sweep auger described in U.S. Pat. No. 3,563,399 and reduced in length to more clearly show its construction;

FIG. 3 is a diagrammatic illustration of the circular bin floor showing its division into concentric sections that are covered by corresponding axial sections of the sweep auger during one complete horizontal revolution thereof;

FIG. 4 is a chart illustrating the volume of the sweep auger over axial sections thereof relative to their corresponding concentric sections shown in FIG. 3;

FIG. 5 is a side elevation of a sweep auger forming a first embodiment of the invention, and FIG. 6 is a side elevation of a sweep auger forming a second embodiment of the invention.

DETAILED DESCRIPTION OF THE INVENTION

Referring now in detail to the drawings and as may be best seen in FIG. 1, a material circulating apparatus, indicated generally as 10, is shown with a circular storage bin 11 having a side wall 12, a roof structure 13, and a false bottom wall or floor 14 spaced above a bin foundation 16. The floor 14 is formed with a central opening 17 and is perforated, as indicated at 18, to provide for ventilation upwardly therethrough of either atmospheric or heated air.

A radially extending sweep auger 19 is rotatably mounted within the bin 11 immediately adjacent to the floor 14 and is adapted to be rotated about its own axis and also to travel angularly above the floor 14 in a horizontal plane to remove, during each horizontal revolution thereof, a predetermined volume of material. The material removed by the sweep auger 19 is delivered to an upright auger (not shown) rotatably mounted within a casing 21. The upright auger functions to deliver the material received from the sweep auger 19 to a distributing apparatus 24 for distribution over the top surface of the material stored in the bin 11. For a more detailed description of the apparatus 24 reference is made to U.S. Pat. No. 3,563,399. The stored material is thus continuously recirculated throughout the bin for uniform drying and moisture content.

When the stored material is to be unloaded from the bin 11, it is delivered by the sweep auger 19 through the central opening 17 to a radially extending unloading auger (not shown) rotatably mounted within a casing 22. The unloading auger is mounted on the foundation 16 beneath the floor 14 of the bin 11 and operates to move the material exteriorly of the bin 11. A blower 23 is mounted so as to force either heated air or ambient air under pressure beneath the floor 14 of the bin 11 for distribution through the foraminous floor 14 and upwardly through the material in the bin to remove moisture from the material.

The auger disclosed in U.S. Pat. No. 3,563,399 has a flighting of variable diameter and a predetermined contour so that during each revolution of the sweep auger around the bin, there is removed a uniform layer of material. This same function is obtained by the sweep auger 19 of this invention for a particle material larger than corn, such as soybeans, coffee beans and the like.

For this purpose, the sweep auger 19, similar to the auger of U.S. Pat. No. 3,563,399, must be capable of transferring inwardly, from any given point along its length, all of the material picked up by the auger portion extended outwardly from such point, plus the grain gathered by that portion of the auger extended inwardly from such point. Thus, any given axial section of the sweep auger 19 should have a material carrying capacity or volume that is sufficient to receive all of the material being moved by the next adjacent axial section outwardly therefrom, plus a predetermined volume of the material that is to be gathered and moved by the given axial section.

Referring to FIG. 2, there is diagrammatically illustrated a sweep auger 26, constructed in accordance with U.S. Pat. No. 3,563,399 and wherein the auger 26 is divided over its length into equal axial sections 27a–27k, inclusive. For the purpose of convenience, the auger 26 will be referred to as the formula auger. Let it be assumed that these axial sections, during a horizontal rotation of the formula auger 26 across the bin floor 14, will travel over corresponding concentric sections illustrated in FIG. 3 and indicated at 28a–28k, inclusive, to remove a bottom layer of the stored material that is of a substantially equal height or thickness over the entire area of the bin floor 14. The removal of a uniform bottom layer, indicated at L in FIG. 4, is essential for optimum material drying. The axial section 27a therefor has a capacity of volume equal to the area of the concentric section 28a multiplied by the thickness of the bottom layer L. This volume is indicated in FIG. 4 as 29a.

The next adjacent inner axial section 27b has a volume or capacity equal to the volume 29a plus the volume indicated at 29b, which is equal to the area of the concentric section 28b times the thickness of the bottom layer L. The overall volume or capacity of the axial section 27b is thus greater than the capacity of the axial section 27a by the volume amount indicated as 29b, which is less than volume 29a.

As shown in FIG. 4, the axial section 27c has a volume capacity equal to that of the axial sections 27a and 27b, plus the volume indicated at 29c, which is equal to the area of the concentric section 28c times the thickness of the bottom layer L. Again it is to be noted that the volume 29c is less than the volume 29b which in turn is less than volume 29a.

As illustrated in FIG. 4, the volume capacity of each axial section 27a–27k progressively increases with a correspondingly progressive decrease in the volumes 29a–29k.

To accommodate these volume variations over its axial length, the sweep auger 26, illustrated in FIG. 2, is constructed generally in accordance with the formula:

$$X = \sqrt{\frac{R^2D^2 - r^2D^2 + r^2S^2}{R^2}}$$

wherein R is the axial length of the sweep auger shaft 31; r is the axial length from the inner end of the auger shaft to any given point outwardly therefrom; X is the diameter of the flighting 32 of the sweep auger 26 at the given point; D is the given diameter of the auger flighting 32 at the delivery or inner end of the sweep auger 26; and S is the diameter of the shaft 31.

Following this formula, the diameter variations in the flighting 32 of the formula auger 26 axially of the auger shaft 31 are relatively small. To better exemplify the results of the formula computations, therefore, the formula auger 26 is illustrated in FIG. 2 with the diameter of the shaft 31 shown full scale, but with the length of the shaft drawn to a scale of one inch being equal to one foot and shown in foot sections corresponding to the axial sections 27a–27k. The diameter of the flighting 32 is drawn to full scale, namely, to the scale of the shaft diameter.

Referring to FIG. 5, only the outer end portion of the sweep auger 19 of this invention is shown. Helically wound around the outer portion of the shaft 34 is a first flight 36 and a second flight 37. A third flight 38 is helically wound about the remaining portion of the shaft 34.

The pitch of the first flight 36 and third flight 38 is constant throughout their length, but the pitch of the second flight 37 is variable over its length. Also, the diameters of the first and second flights 36 and 37, respectively, are identical and constant over their entire lengths. The diameter of the third flight 38, however, is variable and is constructed in accordance with the following formula of U.S. Pat. No. 3,563,399:

$$X = \sqrt{\frac{R^2D^2 - r^2D^2 + r^2S^2}{R^2}}$$

from the inner end of the auger 19 to the junction 39 of the flight 38 with the flights 36 and 37.

As shown in FIG. 2, the flighting 32 of the formula auger 26, is of a relatively small diameter over the outer end portion thereof, comprised of axial sections 27a–27d, inclusive, so that difficulty is encountered in picking up or moving material particles of a size such as unhusked coffee beans or the like. To provide for a positive gathering and the moving of a uniform layer of such large size material particles from adjacent a bin floor, the flightings 36 and 37 over the outer end portion of the auger 19 are of an increased diameter and arranged axially of the auger to obtain a volume removal equal to the volume removal of the corresponding outer end portion of the formula auger 26.

The flights 36 and 37 are connected together at their peripheral edges 42 and 43, respectively, by a spiral ribbon or cover 44 so as to form a composite flight of progressively decreasing thickness axially inwardly of the auger 19. This provides for a narrower but deeper channel portion over the outer end portion of the auger 19 which in turn permits larger material particles to be gathered and moved by the auger.

Referring to FIG. 5, the outer end portion of the auger 19 is shown as comprised of four equal axial sections 41a–41d, inclusive, corresponding to the four axial sections 27a–27d, respectively, of the formula auger 26 of FIG. 2. The diameter of the flights 36 and 37 of the auger 19 is the same and equal to the diameter of the flights 38 at its junction 39 with the composite assembly of the flights 36 and 37. In this respect, it is to be noted that the diameter of the flights 36, 37, and 38 at the junction 39 in FIG. 5 is the same and equal to the diameter D at the junction of the axial sections 27d and 27e of the flight 32 in FIG. 2. Thus, the flight 38 in FIG. 5 corresponds to the axial sections 27e–27k, inclusive, of the flight 32 in FIG. 2, wherein the flights 36 and 37 are indicated by the broken lines B.

In the construction of the auger 19 (FIG. 5), therefore, the formula of U.S. Pat. No. 3,563,399 is followed in forming the flight 38 and the diameter at the outer end of the flight 38 is the same as the diameter of the flights 36 and 37. With the flight 36 being of constant pitch, the variable pitch of the flight 37 is formed such that the volume of material handled by each of the axial sections 27a–27d, inclusive, of the formula auger 26. In other words, sections 41a handles the volume 29a in FIG. 4; section 41b the volume 29b; section 41c the volume 29c; and section 41d the volume 29d. The remaining volumes indicated in FIG. 4 are moved by the flight 38 in all ways similar to that previously described in connection with the flight 32 of the formula auger 26.

In the embodiment shown in FIG. 6, the auger 19a is provided over its entire length with a pair of coacting flights 36a and 37a. These flights have the same diameter, with flight 36a having a constant pitch and flight 37a a variable pitch. Similarly to the flights 36 and 37 of auger 19, the flights 36a and 37a are connected by a spiral cover 44a to form a composite flight of progressively decreasing thickness from the outer end toward the inner end of the auger 19a.

The axial sections 46a–46k, inclusive, of the auger 19a correspond, respectively, to each of the axial sections 27a–27k, inclusive, and the flight 37a is formed such that the volume of material handled by each section 46a–46k, inclusive, is the same as the volume handled by each one of the responding sections 27a–27k, inclusive, of the formula auger 26 during the rotational movement thereof about a bin floor.

With the flights of the augers 19 and 19a constructed so that the volume of material handled by adjacent axial sections thereof conforms and is equal to the volume of material handled by adjacent axial sections of the formula auger 26, the augers 19 and 19a function similarly to the formula auger 26 in removing a uniform layer of material from a bin floor. However, the augers 19 and 19a have the additional capability of handling larger size material particles than the formula auger 26.

Although the invention has been described with respect to preferred embodiments thereof, it is to be understood that it is not to be so limited since changes and modifications can be made therein which are within the full intended scope of this invention as defined by the appended claims.

I claim:

1. Apparatus for moving a horizontal layer of uniform thickness of a free flowing particle material along the bottom wall of a circular storage bin toward the center of the bin comprising:
   a. a sweep auger extended radially of the bin having a shaft,
   b. means for rotating said auger horizontally on said bottom wall about a vertical axis located centrally of the bin,
   c. a pair of auger flights of like diameters secured to said shaft having adjacent helices spaced axially of said shaft, one of said flights having a constant pitch and the other of said flights a variable pitch, and
   d. cover means connected to said adjacent helices to close the space therebetween over the length of said flights,
   e. said pair of flights relatively formed and arranged on said shaft to form a composite flight having adjacent helices of progressively decreasing thickness inwardly of the shaft to provide axially extended sections such that as the auger is horizontally rotated, any given one of said sections has the capacity to move inwardly of the auger all of the particle material picked up by the sections located outwardly from said given section, whereby a horizontal layer of material of uniform thickness is moved by said composite flight toward the center of the bin during each revolution of horizontal rotation of the auger.

2. The apparatus according to claim 1 wherein:
   a. said composite flight extends over only the outer end portion of said shaft,
   b. a third flight secured to said shaft over the remaining portion, said third flight formed in accordance with the formula:

$$X = \sqrt{\frac{R^2D^2 - r^2D^2 + r^2S^2}{R^2}}$$

wherein R is the axial length of said sweep auger shaft; r is the axial length of the sweep auger shaft from the inner end thereof to any given point outwardly therefrom; X is the diameter of the flighting of the sweep auger at said given point; D is the diameter of said flighting at the inner end thereof; and S is the diameter of the sweep auger shaft,
   c. said third flight having a diameter at the outer end thereof equal to the diameter at the inner end of the composite flight, so as to form with said composite flight a continuous flight over the length of said sweep auger.

3. The apparatus according to claim 1 wherein:
   a. said pair of flights extend over the full length of said shaft and terminate in a common helical portion at the inner end of the shaft.

* * * * *